March 2, 1971          H. L. WISMANN          3,567,592
METHOD OF MAKING DENTAL RESTORATIONS
Filed Sept. 16, 1968                         2 Sheets-Sheet 1
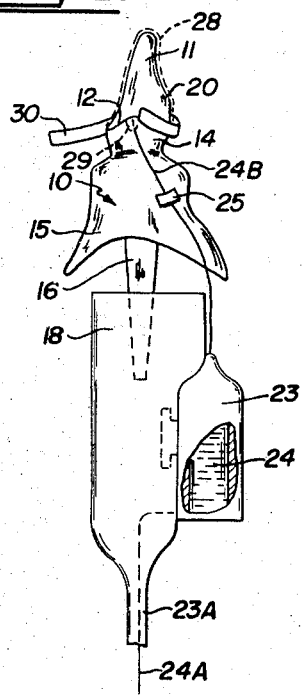
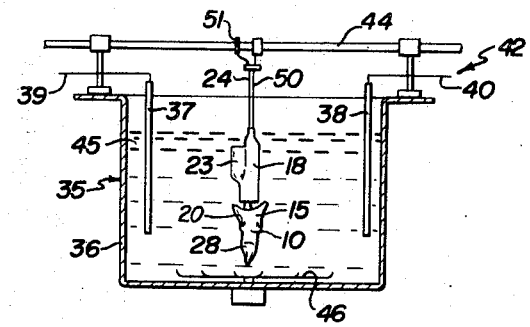
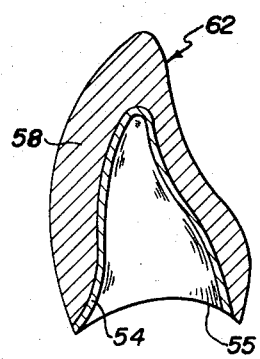
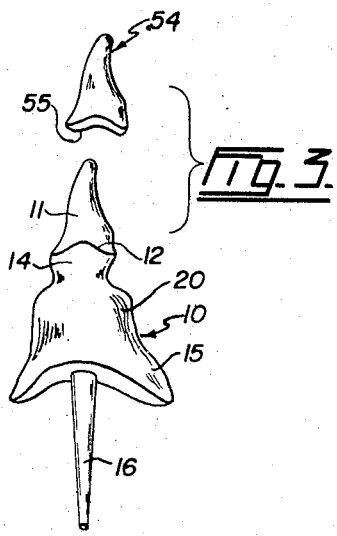
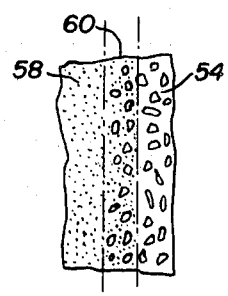
INVENTOR
HORST L. WISMANN
BY
Fetherstonhaugh & Co.
ATTORNEYS March 2, 1971     H. L. WISMANN     3,567,592

METHOD OF MAKING DENTAL RESTORATIONS

Filed Sept. 16, 1968     2 Sheets-Sheet 2

INVENTOR
HORST L. WISMANN
BY
Fetherstonhaugh & Co.
ATTORNEYS

United States Patent Office 3,567,592
Patented Mar. 2, 1971

3,567,592
METHOD OF MAKING DENTAL RESTORATIONS
Horst L. Wismann, 260 E. 16th St., North Vancouver,
British Columbia, Canada
Filed Sept. 16, 1968, Ser. No. 759,873
Int. Cl. C23b 7/02; C23f 17/00
U.S. Cl. 204—9    7 Claims

ABSTRACT OF THE DISCLOSURE

Dental restorations are manufactured by electroplating a ceramal substructure on a die which duplicates the tooth structure to be restored and subsequently applying a porcelain outer layer to the ceramal substructure.

BACKGROUND OF THE INVENTION

My invention relates to improvements in methods of making dental restoration and more particularly to crowns, inlays and bridges.

Dental restorations such as crowns, and bridges usually have a gold base which is covered with porcelain for aesthetic as well as functional reasons. Presently, the gold base is constructed by an exacting and time consuming casting process which is carried out using a die or pattern. To provide such a pattern, the dentist takes an impression of the affected portion of the patient's jaw. A model is then cast, usually in dental stone, using the impression as a mold. The stone model provides a die, part of which duplicates one or more teeth which have been reduced or prepared by the dentist to receive the restoration and, in some instances, also duplicating an adjoining portion of the gum from which a tooth or teeth have been extracted. The die is used during the subsequent gold casting which involves such steps as waxing the pattern to provide a mold cavity, constructing a sprue, investing with a refractory material, burning out the wax, and a number of other well known steps all of which must be carried out with care and precision. It will be apparent that such a casting procedure leaves ample room for errors it being possible for even the most skilled dental technician to destroy an article under construction or to turn out an inferior product. For example, the gold base may be distorted during or after casting with the result that the restoration does not fit properly. A gold casting which is made porous through faulty casting lacks the required strength and toughness and, when impurities from the mold or associated parts reaches the gold alloy, this too reduces the quality of the restoration. In addition to these and many other factors which make restorations difficult to produce when it is necessary to cast gold, it is not practical to cast inlays and the production of bridges presents special difficulties in itself. Large bridge spans are very difficult to cast accurately and minor distortions cannot be detected until after the casting has been completed whereupon cutting and soldering must be done to correct the distortions. Since it is difficult to match the coefficients of expansion of gold and porcelain, there is a possibility a gold-porcelain restoration will crack, chip or flake if subjected to undue expansion and contraction or pressure. And finally, there is the high cost of the gold alloy which must be considered particularly when large quantities are involved such as in bridge construction and when waste in finishing is involved.

SUMMARY OF THE INVENTION

I have overcome the above as well as other disadvantages of conventional methods of making restorations by providing a novel technique which enables crowns, inlays and bridges to be made with relative ease and speed and at relatively low cost. Electroplating is used to plate a metal and ceramic substructure directly on to a die. This substructure of ceramal alloy is provided with a surface coat of porcelain which is baked to fuse with the ceramic and metal particles and thereby provide a particularly effective bond between the two layers. The technique enables a plated substructure of uniform thickness to be produced since the electroplating can readily be controlled. Since the porcelain layer and the metal substructure are thin and have substantially the same mass, their coefficients of expansion are closely matched and this prevents cracking which might otherwise occur.

BRIEF DESCRIPTION OF THE DRAWINGS

FIG. 1 is an elevation showing a die of the type used to practice the present invention, the die being mounted in a holder, FIG. 2 is an elevation, part in section, showing the die-holder assembly in an electroplating apparatus, FIG. 3 is an exploded perspective view of the die and the ceramal substructure produced by the electroplating, FIG. 4 is an enlarged vertical section of the substructure coated with porcelain to form a crown, FIG. 5 is a greatly enlarged section of a portion of the crown.

DESCRIPTION OF THE PREFERRED EMBODIMENTS

Figure 6:
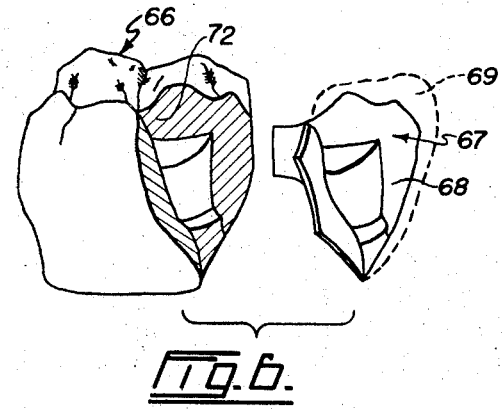
FIG. 6 is an exploded perspective view of a prepared tooth and an inlay therefor.

My method of making crowns, inlays and bridges requires the use of a cast stone die of the type commonly used to fabricate conventional gold-porcelain crowns and the like. Referring to FIG. 1, the numeral 10 indicates a typical die on which a crown can be made by means of the present electrolytic method. This particular die is cut from a stone model (not shown) which is cast using an impression (also not shown) as a mold and has an area 11 which is an exact replica of the reduced or prepared part of the defective tooth. Area 11 is clearly defined by a flanged margin 12 which encircles the die usually a short distance above the neck 14 thereof. Below the neck 14, die 10 has a body 15 which is fitted with a positioning pin 16. This pin enables the die to be temporarily secured to a suitably shaped plating holder 18.

To manufacture a crown for example, using my electroplating technique, the stone die 10 is provided with a protective coating and the material I have found most suitable for such a coating is a clear plastic such as nail polish which is indicated by the shade lines at 20 in FIGS. 1 and 2. The plastic 20 is brushed, sprayed or otherwise applied to cover completely the defined area 11 as well as the remainder of the body 15. This plastic coating protects the stone from the acids contained in the electrolyte which might otherwise etch the stone slightly, and introduce impurities into the bath with detrimental effects. Also, the plastic coating 20 is meltable, which facilitates removal of the electroplated article from the die. The coating 20, when dislodged by melting, also provides a space for the adhesive used by the dentist to secure the finished crown to the prepared tooth.

The area 11 of the die must later be connected into an electrolytic circuit and to do this I prefer to fit the plastic holder 18 with a bobbin-like container 23 in which a length of plastic wire 24 is stored. One end 24A of this wire extends from the container and through a hollow lower part 23A of the holder. The opposite or bared end 24B of the wire extends from the container 23 across the body 15 where it is secured by tape 25, to the vicinity of the neck 14 of the die.

A thin wash of a copper or silver solution is then applied to the defined area 11 of the die. Care is taken to cover this area thoroughly with the metallic solution and at one point the metallized solution is extended below the margin 12 and is touched to the bared end 24B of the lead wire so as to saturate that end. Thus, when the metallized solution dries, area 11 is coated with a very thin layer of electrically conductive metal which forms a cathode indicated by the dotted line at 28 in FIG. 1. Cathode 28 then is electrically connected to the wire 24 so that current is free to flow therebetween. A plastic patch 29 is painted over the connection between wire 24 and cathode 28 so that no electroplating will be done below the margin 12. A strip 30 of adhesive-coated plastic is wound around the margin 12 so as to control the current flow in the vicinity of the margin and thus reduce the amount of electroplating which will be done in that vicinity.

Plating of the area 11 of the die is carried out using conventional electroplating apparatus 35 such as is shown in FIG. 2. Apparatus 35 includes a tank 36 in which two metal anodes 37 and 38 are mounted, the anodes being connected by wires 39 and 40 into a suitable electrolytic circuit 42. A cathode rod 44 is supported above the tank 36, which tank contains an acid-water mixture or bath 45 and suitable means 46 is provided to keep the electrolyte bath in continual agitation during the plating process.

I introduce into the bath 45 suitable quantities of ceramic and metallic particles. Included amongst the metals which have been found suitable for use in the present process are: antimony, magnesium, aluminum, calcium, germanium, gold, manganese, beryllium, cobalt, iron, palladium, chromium, vanadium, platinum, titanium, rhodium, molybdenum, osmium, tungsten and tantallum. The metal which I have found to be particularly well suited for the purpose is nickel and this metal will henceforth be referred to exclusively, although it will be understood that the above listed metals, or a combination of those metals to provide a suitable alloy, can also be used. In addition, oxides, borides and cermets may be added to the electrolytic bath to maintain hardness of the metal or metal alloy and to control oxidation at elevated temperatures as well as to give other desired characteristics to the metal or metals.

The die 10 and holder 18 are inverted and suspended by a wire 50 from the rod 44 so that the die 10 and part of the holder 18 are immersed in the electrolyte. Wire 24 is electrically connected to the cathode rod 44 as at 51. Means 46 is then operated to keep the solution thoroughly agitated and the circuit 42 is energized to cause the cathode 28 to be plated with nickel. After a suitable interval to allow the nickel and ceramic particles to be plated to a depth of not less than 1/10 of a millimetre, the plating is halted. Thus, the nickel and ceramic particles simultaneously are deposited on the cathode 28 and these codeposited particles form a ceramal alloy which has some of the desirable characteristics of both materials. The continual agitation of the bath 45 ensures that the ceramic and metal particles are thoroughly intermingled throughout the electroplated layer. I have found that, generally speaking, the current densities and the plating times required to codeposit the ceramal alloy are not appreciably longer than are required when nickel is deposited alone by conventional electroplating.

After the die 10 has been removed from the apparatus 35 and has been disconnected from the holder 18, heat at a suitably low temperature is applied to the plated part of the die to melt the coating 20. When this is done, the electroplated replica of area 11 can readily be removed as shown in FIG. 3, the replica being a coping-like substructure which is generally indicated at 54. It will be found that the substructure 54 has a near perfect marginal structure 55 which only requires a slight amount of trimming mainly to remove the now broken connection to the wire 24.

Substructure 54 now is provided with an outer surface layer 58 of procelain, see FIG. 4, which is applied and baked thereon in the usual manner well known in restorative dentistry. In FIG. 5, it will be seen that the porcelain layer 58 has particles some of which are mixed with and actually fused to some of the particles of the ceramal alloy. Thus, the ceramic and porcelain particles are fused together and chemically united to provide a particularly strong bonding layer 60, see FIG. 5. A dental restoration or crown such as is indicated generally by the numeral 62 in FIG. 4 is provided by the thus combinded substructure 54 and porcelain layer 58.

Figure 7:
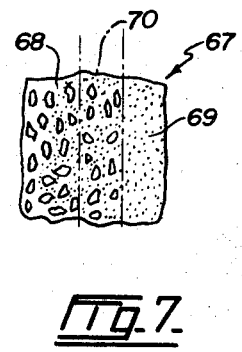
FIG. 7 is a greatly enlarged section of a portion of the inlay.

Referring to FIGS. 6 and 7, the numeral 66 indicates a tooth which has been prepared by a dentist to receive an inlay 67. This inlay is made by the electroplating process described above so as to produce a substructure 68 (see FIG. 7) made up of codeposited ceramic and metal particles. Later, an outer surface layer 69 of porcelain is applied and baked to the ceramal substructure 68, thus providing a bonding layer 70 as before. The electroplating technique provides an inlay or dental restoration which will precisely fit the recess 72 cut by the dentist in the defective tooth. The electroplated and porcelain coated inlay 67 can be cemented into the recess 68 without the need of any great amount of preliminary trimming or further processing once the inlay is so fitted.

Figure 8:
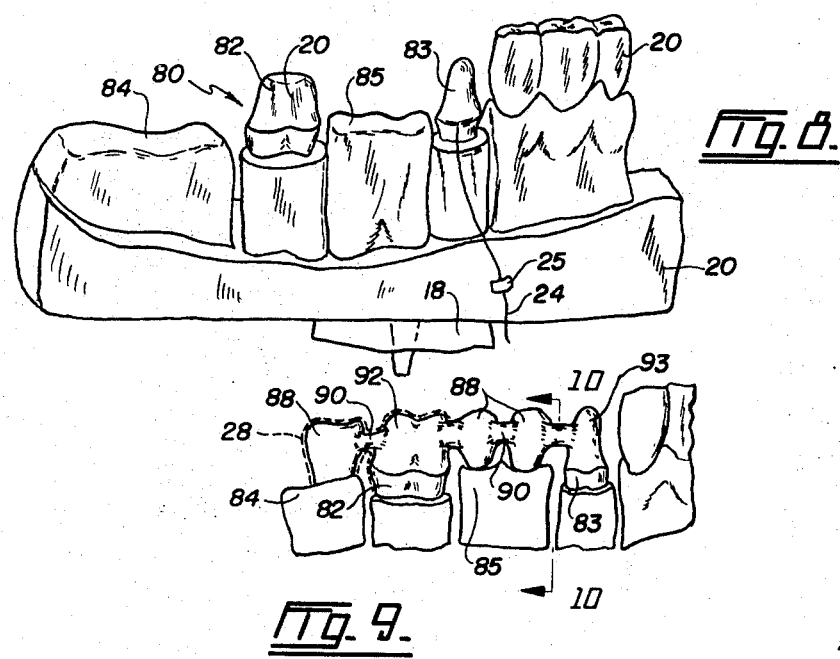
FIG. 8 is a perspective view of a model used to make a bridge.

The present process can also be employed to manufacture dental bridges, and for this purpose, a model 80 is made from the jaw impression, which model may appear as shown in FIG. 8. The particular model shown in FIG. 8 has spaced apart and removable dies 82 and 83 which are similar to the die 10 used to make a crown. Model 80 also has areas 84 and 85 which represent the gum contours of the jaw from which teeth have been extracted on either side of two prepared abutment teeth in the patient's mouth, which teeth are duplicated by the dies 82 and 83.

Figure 10:
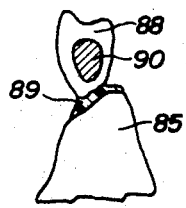
FIG. 10 is a vertical section taken on the line 10—10 of FIG. 9.
Figure 9:
FIG. 9 is a side elevation of the model showing the assembly of parts on which a substructure is formed to manufacture a bridge.

The model 80 is given a protective coating 20 of clear plastic and is mounted in a suitable holder 18 with a lead wire 24 positioned as before. This bridge making technique involves the use of pontic models 88, see FIG. 9, these models being premanufactured of a suitable meltable material such as wax with a high-temperature melting point, or a plastic. The technician selects, in this example of bridge construction, three pontic models which correspond in size and shape to the missing teeth in the patent's jaw. These models 88 are suitably arranged on the areas 84 and 85 and are stabilized on the gum areas by the use of wax or acrylic 89, see FIG. 10. Wax connectors 90 are then used to secure the pontic models to the dies 82 and 83 and also to one another as shown in FIG. 9. Defined areas 92 and 93 of the two dies are then painted with the copper or silver solution to form an extended cathode 28, the solution also being applied to the connectors 90 and to selected portions of the pontic models i.e. to those portions not covered by the connectors or in contact with the gum areas 84 and 85. This assembly is then electroplated in the apparatus 35 to deposit a nickel and ceramic layer on the extended cathode 28.

Figure 11:
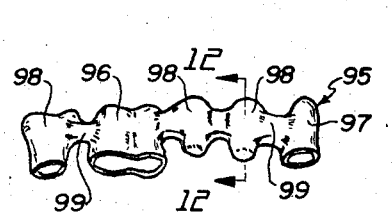
FIG. 11 is a perspective view of a bridge substructure.

When the protective coating 20 later is melted off the defined areas 92 and 93 of the two dies, the electroplated layer is removed as a bridge substructure such as is indicated at 95 in FIG. 11. The ceramal bridge substructure 95 comprises two abutments or copings 96 and 97 which duplicate the areas 92 and 93. Also, substructure 95 includes three pontics 98 and joints 99 which interconnect said pontics and the abutments 96 and 97. At this stage, the pontic models 88 and the wax connectors 90 are enclosed within the substructure 95 and all of this meltable material is now removed by applying heat at a suitable low temperature to the substructure so as to melt out the unwanted material.

Figure 12:
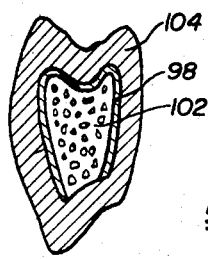
FIG. 12 is a detail section taken on the line 12—12 of FIG. 11 and showing a single finished pontic only, with porcelain added.

The hollow pontics 98 and the tubular joints 99 are now packed with a filler 102 (FIG. 12) which is light in weight and compatible with the ceramal substructure 95. A material I have found to be particularly well suited for use as a filler is a mixture of quartz crystals and an opaque porcelain powder which serves as a bonding agent. The voids left by the models 88 and connectors are filled with this mixture and an outer surface layer of porcelain 104 is applied to the bridge substructure 95 so as to cover the filler 102, see FIG. 12. Thus, when the porcelain is baked, the filler 102 is sealed within the substructure and all parts of the bridge are porcelain coated except of course, the interior surfaces of the abutments 96 and 97. As is the case with the previously described crown and inlay, the porcelain surface layer and the ceramal base layer of the crown are bonded together securely by a fused intermediate or composite bonding layer made up of intermingled particles of both layers.

Figure 13:
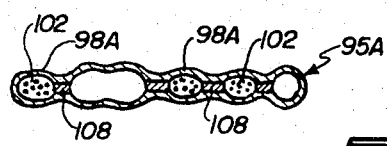
FIG. 13 is a longitudinal section plan view of a modified bridge substructure.

As an alternative to using wax connectors 90, I propose to use solid metal connectors 108 as shown in FIG. 13. Preferably, the connectors 108 are made of the same metal which is being electroplated with the ceramic particles, i.e., nickel if that metal is being used in the ceramal alloy. Use of solid metal connectors 108 results in the production of a modified bridge substructure 95A (FIG. 13) with said connector being enclosed by the electroplated alloy. The pontics 98A of the modification are packed with the filler 102 as before and when the porcelain layer (not shown) later is applied, the filler again is sealed within the bridge substructure. The particular construction is particularly well suited where lengthy bridge spans are involved and an exceptionally strong joint must be provided between the pontics and the abutments.

If desired, a supply of pontics can be manufactured using the present process and these pontics can be employed in bridge construction in place of the wax or plastic pontic models previously mentioned. The abutments for such a bridge are electroplated as previously described and, while the abutments are still on the model, selected premanufactured pontics are secured to the abutments by soldering. The resulting ceramal substructure is then completed by the filling and porcelain coating steps previously described.

From the foregoing it will be seen that I have provided a method of making dental restorations which has numerous advantages over the conventional method and included amongst these are the very large reduction in the time which is required to produce the restorations by the new electroplating technique as compared to the old casting technique, the time saving being approximately 50%. A saving is also affected in the cost of material and less skilled labor is required to produce the various types of dental restorations. The procedure makes it possible to form the restorations in two layers which have closely matched coefficients of expansion. An almost unbreakable bond is provided between the two layers and there is less likelihood of structural failure due to unequal expansion and contraction of the restoration during fabrication and also when installed in the mouth. In addition, a very precise fit is assured and the light weight construction makes the restoration comfortable to wear. Aesthetic and functional requirements of restorations readily achieved and the technique readily lends itself to mass production.

I claim:

1. The method of making a dental restoration using a die having a defined area duplicating a prepared tooth portion to which the restoration eventually will be secured which method comprises applying a protective coating of meltable material to the die, attaching a lead wire of an electrolytic circuit to the die adjacent the defined area, coating the defined area with an electrically conductive material to provide a cathode in electric contact with the lead wire, suspending the die in an electrolytic bath containing metal and ceramic particles to codeposit said particles as a ceramal alloy on the cathode and form a substructure, melting the protective coating from the die to free the substructure, and applying and baking an outer surface layer of porcelain to the substructure.

2. The method of making a dental restoration using spaced dies each having a defined area duplicating a prepared tooth portion to which the restoration eventually will be secured which method comprises depositing a protective coating of meltable material on the dies, securing a pontic model to the dies by connectors, attaching a lead wire of an electrolytic circuit to a die, coating the defined areas, a selected portion of the pontic model, and the connectors with an electrically conductive material to provide a cathode in electric contact with the lead wire, suspending the dies in an electrolytic bath containing metal and ceramic particles to codeposit said particles as a ceramal alloy on the cathode and form a bridge substructure, melting the protective coating from the dies to free the bridge substructure, removing the pontic model from the bridge substructure, filling the void left by the pontic model with a lightweight filler compatible with the bridge substructure, and applying and baking an outer surface layer of porcelain to the bridge substructure and to the filler.

3. The method as claimed in claim 2, in which said pontic model is meltable and is removed from the bridge substructure by the application of heat.

4. The method as claimed in claim 2, in which said pontic model and said connectors all are meltable and are removed from the bridge substructure by the application of heat, the removed connectors leaving voids which also are filled with the lightweight filler.

5. The method as claimed in claim 2, in which the lightweight filler is a mixture of quartz crystals and porcelain powder.

6. A dental restoration comprising a substructure containing electrolytically codeposited ceramic and metallic particles, an outer surface layer of porcelain baked on the substructure, said outer surface layer of porcelain having some particles intermingled with and fused to the particles of the substructure to form a composite bonding layer.

7. A dental restoration as claimed in claim 6, in which said substructure comprises spaced abutments and an intermediate hollow pontic, connector means securing the intermediate hollow pontic to each of the spaced abutments, a filler within the hollow pontic, said filler and connector means being covered by the outer surface layer of porcelain.

References Cited

UNITED STATES PATENTS

| | | | |
|---|---|---|---|
| 387,778 | 8/1888 | Diehl | 204—4 |
| 2,094,308 | 9/1937 | Snell | 204—4 |
| 2,841,548 | 7/1958 | Perlman | 204—4 |
| 3,061,525 | 10/1962 | Grazen | 204—3 |

TA-HSUNG TUNG, Primary Examiner

T. TUFARIELLO, Assistant Examiner

U.S. Cl. X.R.

204—38